United States Patent
Nammi et al.

(10) Patent No.: US 10,772,024 B2
(45) Date of Patent: Sep. 8, 2020

(54) ADAPTIVE MULTIPLE ANTENNA TRANSMISSION SCHEME FOR UPLINK DATA TRANSMISSION IN WIRELESS COMMUNICATION SYSTEMS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 104 days.

(21) Appl. No.: 15/869,763

(22) Filed: Jan. 12, 2018

(65) Prior Publication Data

US 2019/0223074 A1    Jul. 18, 2019

(51) Int. Cl.
| | |
|---|---|
| H04W 36/32 | (2009.01) |
| H04B 7/185 | (2006.01) |
| H04W 64/00 | (2009.01) |
| H04W 36/00 | (2009.01) |
| H04L 1/00 | (2006.01) |
| H04L 5/00 | (2006.01) |
| H04W 24/10 | (2009.01) |

(52) U.S. Cl.
CPC .......... *H04W 36/32* (2013.01); *H04B 7/1855* (2013.01); *H04L 1/0078* (2013.01); *H04L 5/0069* (2013.01); *H04W 36/0083* (2013.01); *H04W 64/006* (2013.01); *H04W 24/10* (2013.01)

(58) Field of Classification Search
CPC ............. H04W 36/32; H04W 36/0083; H04W 64/006; H04W 24/10; H04B 7/1855; H04B 7/0417; H04B 7/0456; H04B 7/0486; H04B 7/0639; H04B 7/063; H04B 7/0689; H04L 1/0078; H04L 5/0069; H04L 25/03343
See application file for complete search history.

(56) References Cited

U.S. PATENT DOCUMENTS

| | | | |
|---|---|---|---|
| 8,379,745 B1 * | 2/2013 | Nabar | H04B 7/0617 375/267 |
| 8,594,036 B2 | 11/2013 | Kang et al. | |
| 8,665,149 B2 * | 3/2014 | Joo | G01S 19/235 342/357.63 |
| 8,699,547 B2 | 4/2014 | Yu et al. | |

(Continued)

FOREIGN PATENT DOCUMENTS

| | | | | |
|---|---|---|---|---|
| WO | WO-2005094026 A1 * | 10/2005 | ........... | H04L 1/0003 |
| WO | 2017188736 A2 | 11/2017 | | |

*Primary Examiner* — Matthew C Sams
(74) *Attorney, Agent, or Firm* — Amin, Turocy & Watson, LLP

(57) ABSTRACT

The described technology is generally directed towards adaptively changing which transmission scheme a user equipment is to use based on a Doppler metric (e.g. Doppler frequency) as evaluated against a threshold Doppler value. A network instructs a user equipment to use a Rank-1 precoder cycling transmission scheme if the Doppler metric of user equipment is above a threshold value, or to use a closed loop MIMO transmission scheme if the user equipment has a Doppler metric below the threshold value. The network can instruct the user equipment via a suitable message, or by switching off TPMI and notifying the user equipment thereof.

20 Claims, 11 Drawing Sheets

(56) References Cited

U.S. PATENT DOCUMENTS

| | | | |
|---|---|---|---|
| 8,737,512 B2* | 5/2014 | Tan | H04B 7/0689 370/252 |
| 8,831,116 B2 | 9/2014 | Xiao et al. | |
| 8,891,646 B2 | 11/2014 | Nammi et al. | |
| 8,908,747 B2* | 12/2014 | Nammi | H04B 7/0486 375/219 |
| 8,953,702 B2 | 2/2015 | Aubert et al. | |
| 9,014,287 B2 | 4/2015 | Luo et al. | |
| 9,166,659 B2* | 10/2015 | Nammi | H04B 7/0456 |
| 9,306,644 B2 | 4/2016 | Bergman et al. | |
| 9,392,549 B2 | 7/2016 | Mobasher et al. | |
| 9,735,932 B2 | 8/2017 | Luo et al. | |
| 9,876,553 B2 | 1/2018 | Choi et al. | |
| 2002/0000948 A1* | 1/2002 | Chun | H04B 7/0626 343/853 |
| 2004/0087329 A1* | 5/2004 | Shinoi | H04L 1/0026 455/522 |
| 2005/0164644 A1* | 7/2005 | Shinoi | H04B 1/7097 455/69 |
| 2005/0286410 A1* | 12/2005 | Truong | H04L 1/0002 370/216 |
| 2007/0160122 A1* | 7/2007 | Yoshida | H04L 1/0003 375/219 |
| 2007/0287386 A1* | 12/2007 | Agrawal | H04L 67/24 455/67.11 |
| 2010/0311430 A1* | 12/2010 | Katayama | H04L 1/0027 455/450 |
| 2012/0051453 A1* | 3/2012 | Luo | H04L 1/0031 375/295 |
| 2012/0108200 A1* | 5/2012 | Rubin | H04L 47/20 455/405 |
| 2012/0127948 A1* | 5/2012 | Chung | H04L 5/0053 370/329 |
| 2013/0022142 A1* | 1/2013 | Nammi | H04B 7/0689 375/267 |
| 2013/0044610 A1* | 2/2013 | Zhao | H04B 7/0417 370/252 |
| 2013/0203421 A1* | 8/2013 | Ma | H04W 36/32 455/437 |
| 2013/0315284 A1* | 11/2013 | Nammi | H04B 7/0486 375/219 |
| 2014/0349584 A1* | 11/2014 | Clevorn | H04B 7/0871 455/67.13 |
| 2015/0003553 A1* | 1/2015 | Nammi | H04B 7/0456 375/267 |
| 2015/0288788 A1* | 10/2015 | Liu | H04M 1/0264 455/414.1 |
| 2016/0127018 A1 | 5/2016 | Nammi et al. | |
| 2017/0366311 A1 | 12/2017 | Iyer et al. | |
| 2018/0227029 A1* | 8/2018 | Nammi | H04W 24/10 |

* cited by examiner

ADAPTIVE MULTIPLE ANTENNA TRANSMISSION SCHEME FOR UPLINK DATA TRANSMISSION IN WIRELESS COMMUNICATION SYSTEMS

TECHNICAL FIELD

The subject application is related to wireless communication systems, and, for example, to adaptively changing the transmission scheme in use in a wireless communication system.

BACKGROUND

In wireless communication systems, multiple input multiple output (MIMO), is an antenna technique configured to improve the spectral efficiency and thereby boost overall system capacity. The MIMO technique uses a commonly known notation (M×N) to represent MIMO configuration in terms number of transmit (M) and receive antennas (N) on one end of the transmission system. MIMO systems can significantly increase the data carrying capacity of wireless systems. MIMO can be used for achieving diversity gain, spatial multiplexing gain and beamforming gain.

In new radio, sometimes referred to as 5G, user equipment computes channel estimates based on pilot or reference signals from the 5G system, and computes the parameters needed for channel state information (CSI) reporting. A CSI report, including channel quality indicator (CQI) data, is sent from the user equipment to a network device on demand via a feedback channel on request from the network, and/or the user equipment may be configured to send the CSI report periodically. A network scheduler uses this information in choosing the parameters for scheduling of this particular user equipment. The network sends the scheduling parameters to the user equipment in a downlink control channel. After that, actual data transfer takes place from the network to the user equipment.

While MIMO provides many benefits, in new radio, the performance of conventional MIMO systems degrades under certain conditions, including at high user equipment speeds. More particularly, when a mobile device is moving at high speeds, the receiver of a signal is moving in relation to the transmitter, resulting in the Doppler effect because the frequency of the signal is shifted, such that it is perceived to be different at the receiver than at the transmitter. The performance degradation is severe when the signal to noise ratio (SNR) is high. If the rank in transmission is high, it is also the case that the SNR is high. For high rank systems, the impact due to mismatch between the transmitter and receiver channel qualities is severe.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
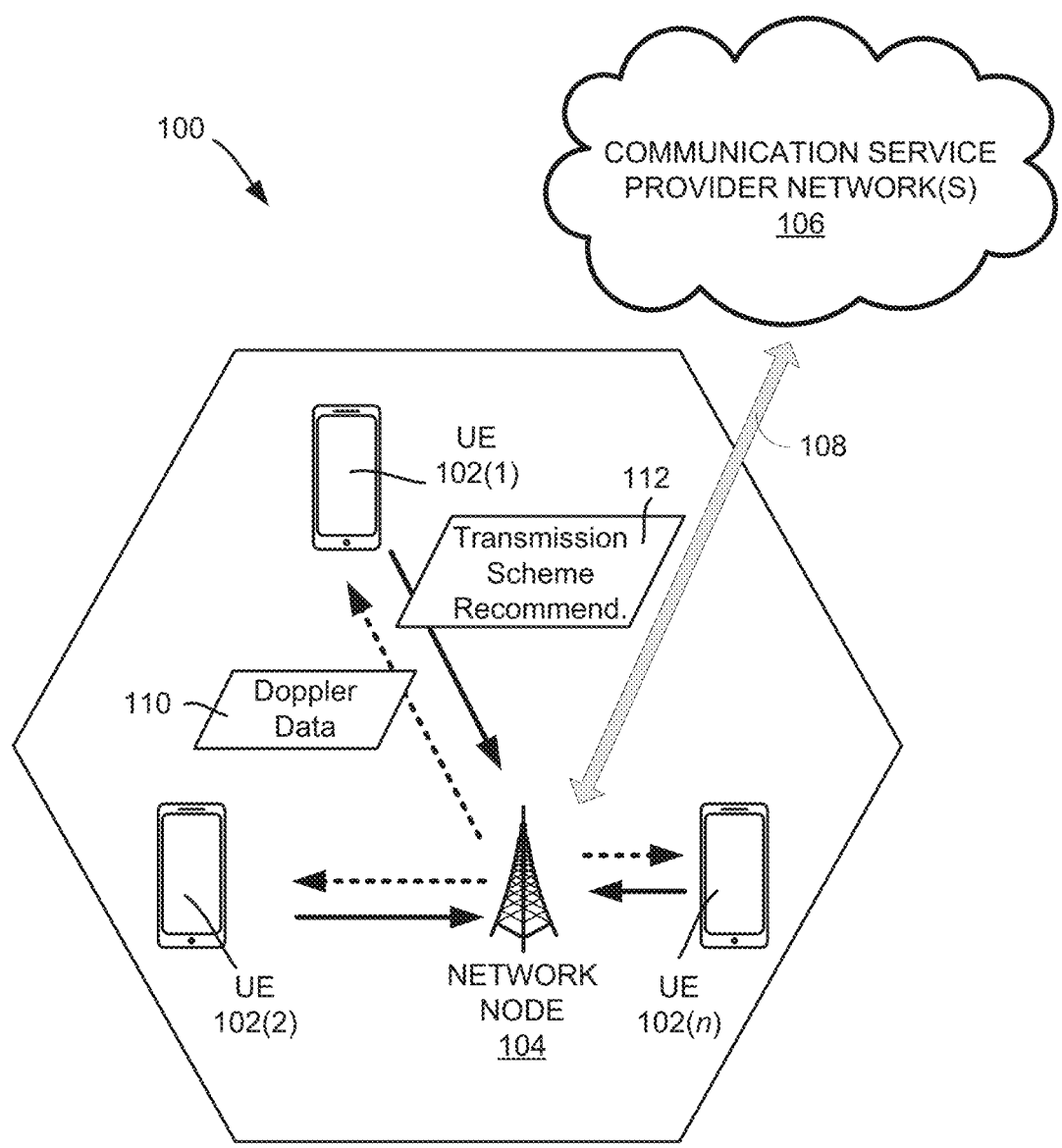
FIG. 1 illustrates an example wireless communication system in which a network node device (e.g., network node) and user equipment (UE) can implement various aspects and implementations of the subject disclosure.

Briefly, one or more aspects of the technology described herein are generally directed towards adapting the multiple antenna transmission scheme for uplink data transmission in wireless communication systems based on a Doppler metric of a user equipment, which in general thereby improves the uplink MIMO (multiple input, multiple output) performance.

One or more aspects of the technology described herein comprise having a network node (network device) determine the Doppler Metric of the user equipment, and based on the Doppler metric versus a Doppler metric threshold value, inform the user equipment to change the transmission scheme, if needed. This may operate to change the transmission scheme from closed loop MIMO to open loop MIMO (Rank-1 precoder cycling), or from open loop MIMO to closed loop MIMO.

To this end, the network device operates by obtaining information about the Doppler metric of the UE, and determining if the Doppler metric is above or below a pre-defined threshold Doppler metric value. In general, if the Doppler metric is above the threshold Doppler metric value and the closed loop MIMO transmission scheme is in use, the network device communicates a recommendation to the usual equipment to switch to the Rank-1 precoder cycling transmission scheme. Conversely, if the Doppler metric is below the threshold Doppler metric value and the transmission scheme in use is the Rank-1 precoder cycling transmission scheme, the network device communicates a recommendation to the user equipment to switch to the closed loop MIMO transmission scheme. Note that alternatively, instead of communicating a recommendation, the network device can switch off the transmit precoding matrix index (TPMI) information, and notify the user equipment of this change.

Operations for which the user equipment is responsible include receiving the recommendation from the network device, and determining the transmission scheme based on the network device recommendation. Further, the user equipment applies the recommended transmission scheme for uplink MIMO data transmission.

As can be readily appreciated, with the above technology, the uplink MIMO performance is improved at high Doppler frequencies. This results in increased network capacity due to improved user equipment performance at high Doppler frequencies.

It should be understood that any of the examples and terms used herein are non-limiting. For instance, the examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Further, as used in the examples herein, closed loop MIMO data transmission and Rank-1 precoder cycling transmission schemes are described as non-limiting examples; however it is understood that the technology described herein can be used to adaptively switch between one or more other transmission schemes. Thus, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

FIG. 1 illustrates an example wireless communication system 100 in accordance with various aspects and embodiments of the subject technology. In one or more embodiments, the system 100 can comprise one or more user equipment UEs 102(1)-102(n).

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE) 102, thus providing connectivity between the UE and the wider cellular network.

In example implementations, each UE 102 such as the UE 102(1) is able to send and/or receive communication data via a wireless link to the network device 104. The dashed arrow lines from the network device 104 to the UE 102 represent downlink (DL) communications and the solid arrow lines from the UE 102 to the network devices 104 represents uplink (UL) communications.

The system 100 can further include one or more communication service provider networks 106 that facilitate providing wireless communication services to various user equipment, including UEs 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled). Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is, data plus speech is simultaneously scheduled).

FIG. 1 illustrates an example wireless communication system 100 in accordance with various aspects and embodiments of the subject technology. In one or more embodiments, the system 100 can comprise one or more user equipment UEs 102(1)-102(n).

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE) 102, thus providing connectivity between the UE and the wider cellular network.

In example implementations, each UE 102 such as the UE 102(1) is able to send and/or receive communication data via a wireless link to the network device 104. The dashed arrow lines from the network device 104 to the UE 102 represent downlink (DL) communications and the solid arrow lines from the UE 102 to the network devices 104 represents uplink (UL) communications.

The system 100 can further include one or more communication service provider networks 106 that facilitate providing wireless communication services to various user equipment, including UEs 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to provide Doppler-related data 110, and may receive a transmission scheme recommendation 112, (or a notification that results in a change to the transmission scheme). To this end, the user equipment transmits information from which a Doppler metric may be computed, and based in part on the computed Doppler metric, the network device 104 can decide whether the user equipment is to change its transmission scheme.

Figure 2:
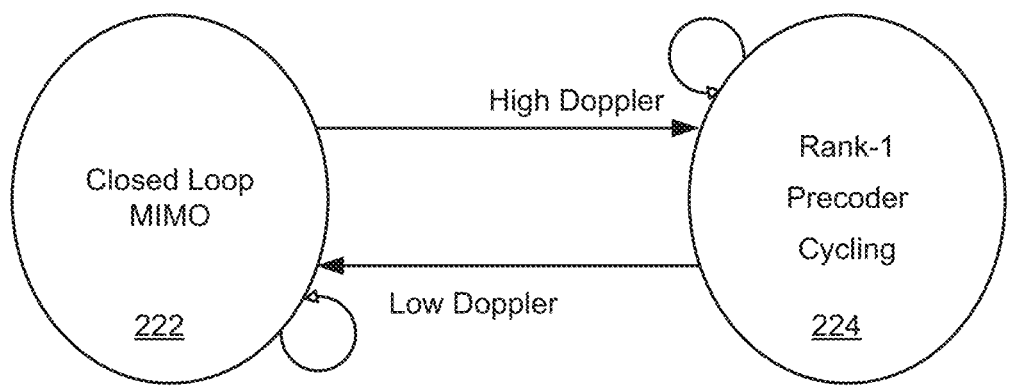
FIG. 2 illustrates an example state diagram that represents transitions for switching from one transmission scheme to another based on the Doppler metric, in accordance with various aspects and implementations of the subject disclosure.

FIG. 2 initially shows a state diagram having two exemplified states for transmission schemes, namely a closed loop MIMO transmission scheme state 222 and a Rank-1 precoder cycling transmission scheme state 224. As can be seen, if the user equipment is operating in the closed loop MIMO scheme state 222 and a high Doppler (relative to a threshold value) is determined, the state transitions to the Rank-1 precoder cycling transmission scheme state 224. Conversely, if the user equipment is operating in the Rank-1 precoder cycling transmission scheme state 224 and a low Doppler (relative to a threshold value) is determined, the state of the transmission scheme in use transitions to the closed loop MIMO scheme state 222.

To this end, in one or more implementations, when the network device 104 detects the user equipment 102 is moving with a high Doppler frequency greater than a threshold $D_{th}$, the network device 104 communicates to the user equipment 102 to change to rank-1 precoder cycling, e.g., by using one bit information in the downlink control channel. With rank-1 precoder cycling, the user equipment 102 can use random precoders at the transmission side. The random precoders are done at the PRG, (i.e., block of resource block groups). In general with the rank-1 random pre coding, with the rank equal to one, the reliability of the transmitted signal increases, thereby reducing the CSI (Channel State Information) estimation error due to the high Doppler shift between the transmitter and the receiver. Note that for Rank-1 precoder cycling, instead of only one SRS (sounding reference signals, specifically intended to be used by the network device to acquire CSI and beam specific-information), the user equipment 102 sends multiple SRS signals, e.g., N, where each SRS signal is precoded with different precoder cycling, e.g., the precoders set is M entries. Then a first SRS configuration uses precorder cycling starting from 1 . . . M. The second SRS source starts the precoders cycling from 2 . . . M . . . 1. The third SRS resource starts the precoder cycling from 3 . . . M.1.2. etc.

Once the network device 104 receives these precoded SRS, the network device 104 estimates the SINR/CQI/MCS (signal-to-interference plus noise ratio/channel quality indicator/modulation and coding scheme) of each SRS and chooses the best SRS source indication (SRI), and indicates this information in the downlink control channel. Once the user equipment 102 receives the SRI, the user equipment 102 uses the same precoder cycling, that is, selected for SRI, and uses the same precoder cycling for data transmission (PUSCH).

Similarly, whenever the network device 104 detects the user equipment has changed its speed and is moving with a relatively slow speed (based on the Doppler frequency), the network device 104 will inform the user equipment 102 to change the transmission scheme to the closed loop MIMO mode.

Figure 3:
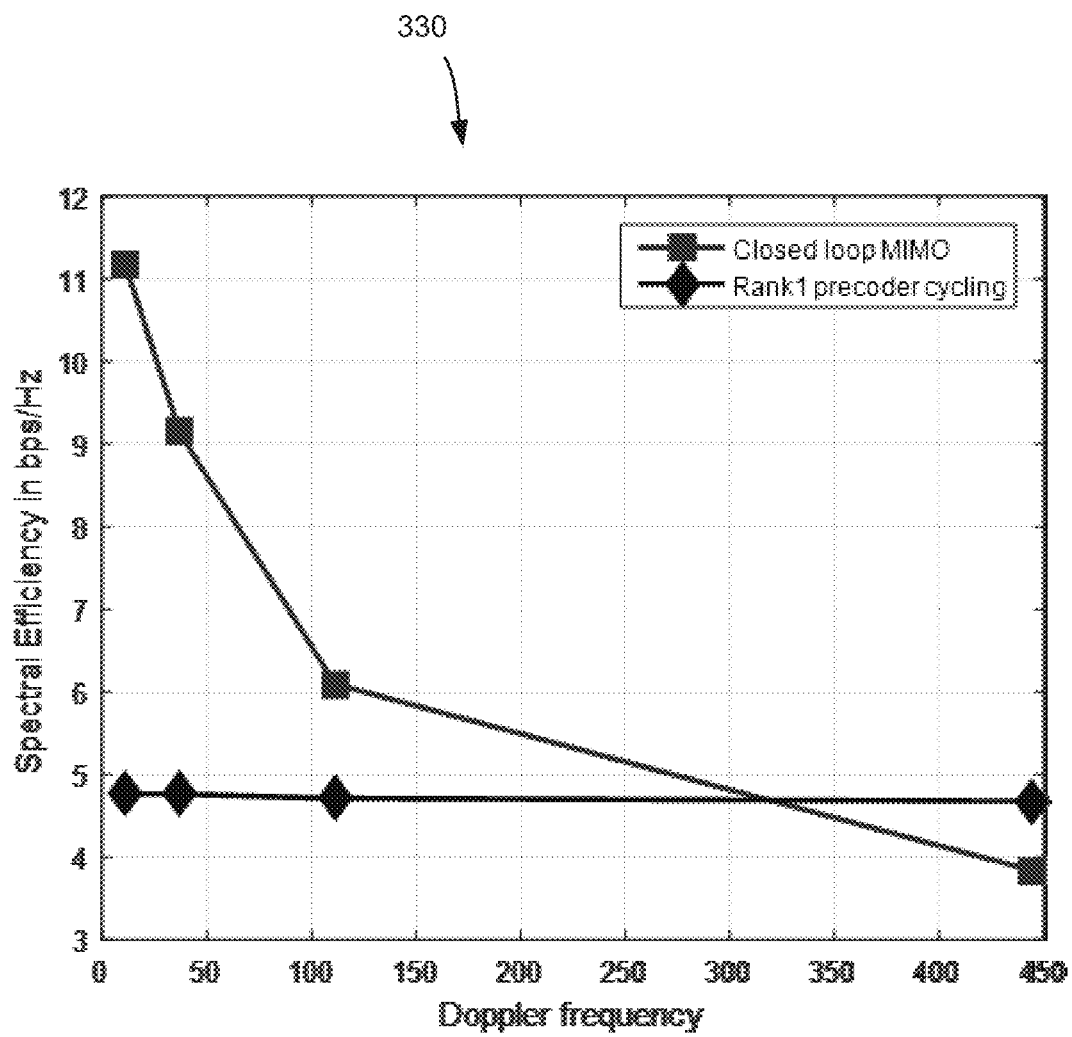
FIG. 3 is a graphical representation that illustrates spectral efficiency vs. Doppler frequency for a closed loop MIMO transmission scheme and a Rank-1 precoder cycling transmission scheme, in accordance with various aspects and implementations of the subject disclosure.

FIG. 3 is a graph representation 330 that exemplifies the spectral efficiency of the rank-1 precoder cycling as a function of Doppler frequency with wideband CQI, in contrast to that of closed-loop MIMO. It can be observed from FIG. 3 that while closed loop MIMO the grades in spectral efficiency as the Doppler frequency increases, the Rank-1 precoder cycling performance varies very little.

In this particular example, the network device 104 thus informs the user equipment 102 to switch to Rank-1 precoder cycling when the user equipment's Doppler frequency goes above 320. Note however that it is feasible to anticipate an increase in the user equipment Doppler frequency, and for example, use a different threshold value as speed is increasing. Similarly, the network device 104 informs the user equipment 102 to switch to the closed loop MIMO transmission scheme as the user equipment speed, corresponding to the Doppler frequency, slows down. Again, the network device 104 can recognize that the user equipment 102 is slowing down and use a different threshold value in this situation. In this way, a user equipment with a Doppler frequency varying around 320 does not result in frequent changes to the transmission scheme. As another alternative, regardless of whether the user equipment is slowing down or speeding up, different threshold values can be used for what is considered a high Doppler frequency before changing to the Rank-1 precoder cycling transmission scheme versus what is considered a low Doppler frequency before changing to the closed loop MIMO transmission scheme for generally the same reason, e.g. to avoid too-frequent changes.

Figure 4:
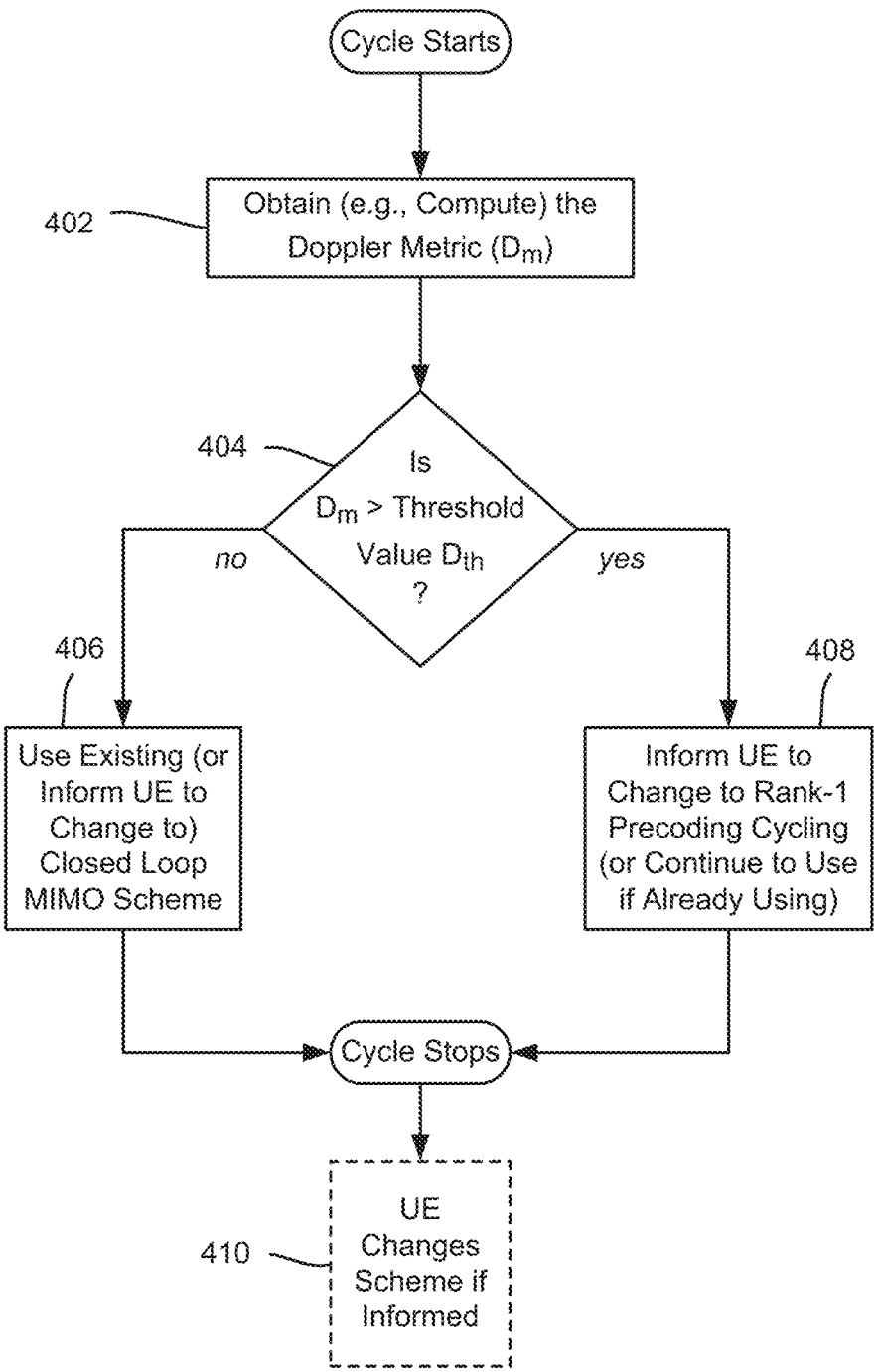
FIG. 4 is a flow diagram representing example operations for selecting and using a transmission scheme based on a Doppler metric, including notifying the user equipment, in accordance with various aspects and implementations of the subject disclosure.

FIG. 4 shows an example of one set of operations using the Doppler metric data as the decision criterion for switching to precoder cycling. Note that other decision criterion/criteria in addition to the Doppler metric data may be used for making a decision.

Operation 402 represents obtaining at the network device 104 the Doppler metric for a specific user equipment, e.g., 102(1). Note that this may include computing the Doppler metric from one or more received data.

By way of some non-limiting examples, direct speed measurement is one way the Doppler metric may be obtained, e.g., the network device 104 can compute the direct speed of the user equipment, such as by obtaining positioning information or GPS information at multiple intervals. Then the Doppler metric ($D_m$) can be taken as average of the individual speed measurement. Another way is to obtain/determine a rate of change of uplink channel estimates, e.g., the network device 104 estimates the uplink channel. The rate of change of uplink channel gives a measure of Doppler metric $D_m$.

Yet another way to obtain the Doppler metric $D_m$ is based on the rate of change of the downlink channel quality information (CQI):

Let CQI represent the channel quality information reported by the user equipment at any given time interval.
Let $\Delta$CQI represents the rate of change of CQI over K.
Then the Doppler metric can be computed as $D_m = \Delta CQI/\Delta T$ Once $D_m$ is obtained, operation 404 determines if the user equipment is moving a high speed (high Doppler) or low speed (low Doppler) based on the Doppler threshold value $D_{th}$. If a low speed, operation 406 represents continuing to use/switching to the closed loop MIMO scheme. If at a high speed, operation 408 represents informing the UE to change to Rank-1 precoding cycling (or continuing to use Rank-1 precoding cycling if already using). Once the UE receives the information, the UE changes its transmission scheme (operation 410) if so informed, e.g., switches to rank-1 precoder cycling or closed loop MIMO if needed, and transmits data.

Figure 5:
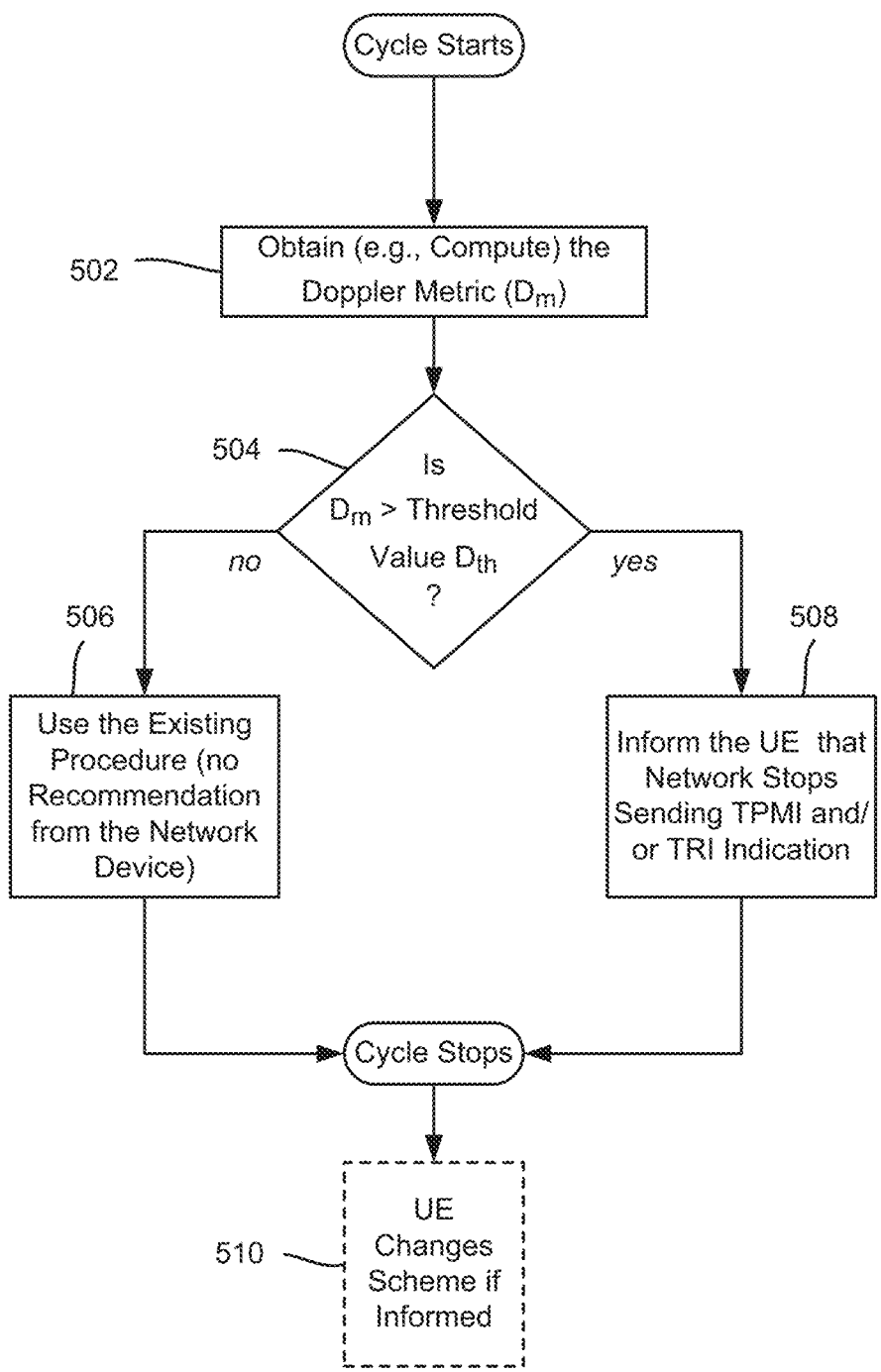
FIG. 5 is a flow diagram representing example operations for selecting and using a transmission scheme based on a Doppler metric, including by switching off TPMI, in accordance with various aspects and implementations of the subject disclosure.

In an alternative embodiment, FIG. 5 describes a scenario in which the network device 104 can obtain and check the Doppler metric at steps 502 and 504 (as in FIG. 4, steps 402 and 404), and if above the threshold, inform the user equipment (operation 508) that the network device switches off the TPMI indication in the downlink control channel. This is because without TPMI and TRI=1, (where TRI is the transmit rank indicator), the network reports the CQI which corresponds to the CQI of precoded SRS. In this way, the user equipment can use precoder cycling as described herein. Note that in the above technique the network needs to inform the user equipment (operation 508) that it switches off the TPMI indication. This can be done, for example, by having the network uses higher layer signaling (RRC) or physical layer signaling (DCI) to inform the user equipment. As can be readily appreciated, operation 506 can do nothing if the scheme is the appropriate one given the Doppler metric versus the threshold value, or can switch/notify that TPMI is back on. Once the UE receives the information, the UE changes its transmission scheme (operation 510) if so informed, e.g., switches to rank-1 precoder cycling or closed loop MIMO if needed, and transmits data.

Figure 6:
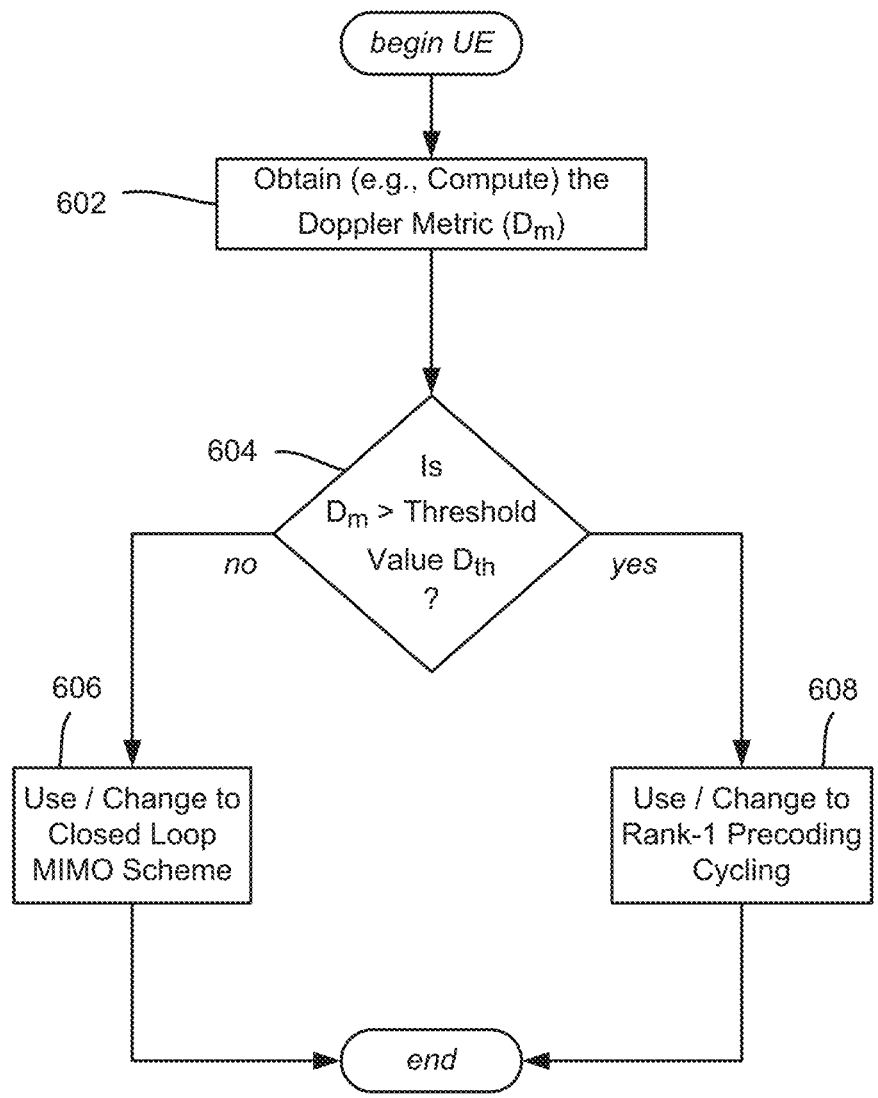
FIG. 6 is a flow diagram representing example operations for selecting and using a transmission scheme based on a Doppler metric at a user equipment, in accordance with various aspects and implementations of the subject disclosure.

It yet another alternative embodiment, FIG. 6 shows a scenario in which the user equipment changes based on its own evaluation of the Doppler metric versus the threshold value. Note that operation 602 represents the user equipment obtaining the Doppler metric, such as by computing via GPS coordinate changes over time. Notwithstanding, it is feasible for the network device to provide at least some information used in determining the Doppler metric.

Operation 604 evaluates the Doppler metric versus the threshold value. If below, the user equipment switches (or continues to use) the closed loop MIMO transmission scheme, as represented via operation 606. If above the threshold, the user equipment switches (or continues to use) the Rank-1 precoder cycling scheme, as represented via operation 608.

Figure 7:
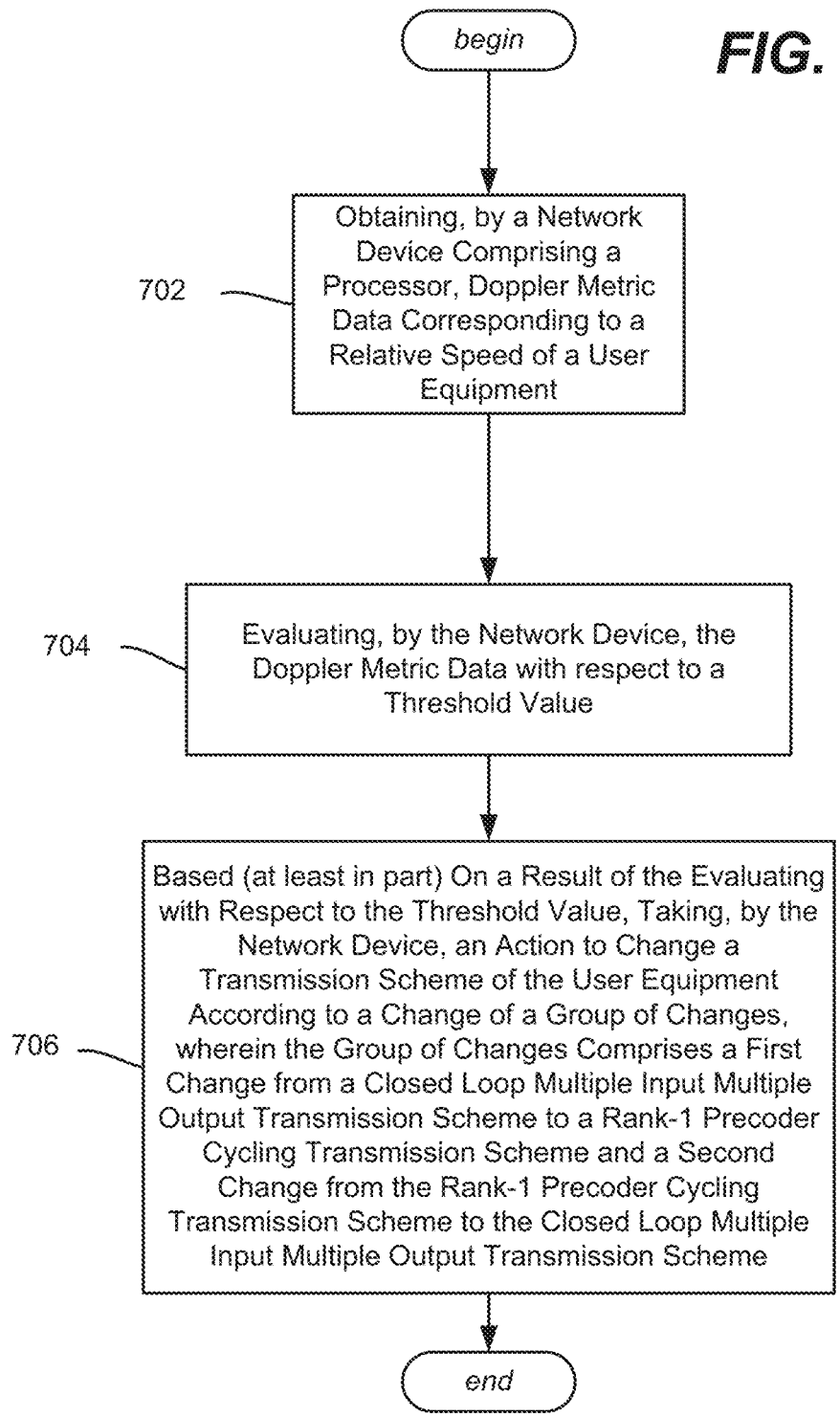
FIG. 7 illustrates an example flow diagram of network device operations for taking action to change the transmission schema the user equipment based on a Doppler metric, in accordance with various aspects and implementations of the subject disclosure.

One or more aspects, generally represented in FIG. 7, are generally directed towards obtaining, by a network device comprising a processor, Doppler metric data corresponding to a relative speed of a user equipment as represented via operation 702. Operation 704 represents evaluating, by the network device, the Doppler metric data with respect to a threshold value. Operation 706 represents, based at least in part on a result of the evaluating with respect to the threshold value, taking, by the network device, an action to change a transmission scheme of the user equipment according to a change of a group of changes, wherein the group of changes comprises a first change from a closed loop multiple input multiple output transmission scheme to a rank-1 precoder cycling transmission scheme and a second change from the rank-1 precoder cycling transmission scheme to the closed loop multiple input multiple output transmission scheme.

The result of the evaluating can indicate that the Doppler metric data is above the threshold value, and taking the action can comprise communicating a recommendation of the transmission scheme to the user equipment to change the transmission scheme according to the first change from the closed loop multiple input multiple output transmission scheme to the rank-1 precoder cycling transmission scheme.

The result of the evaluating can indicate that the Doppler metric data is below the threshold value, and taking the action can comprise communicating a recommendation of the transmission scheme to the user equipment to change the transmission scheme according to the second change from the rank-1 precoder cycling transmission scheme to the closed loop multiple input multiple output transmission scheme.

Taking the action can comprise communicating a recommendation of the transmission scheme to the user equipment via a flag value in downlink control channel data.

The result of the evaluating can indicate that the Doppler metric data is above the threshold value, and taking the action can comprise communicating information to the user equipment that informs the user equipment that the network device is discontinuing a process of sending a transmit precoding matrix index indication to the user equipment. Communicating the information can comprise communicating the information via radio resource control signaling or physical layer signaling.

The result of the evaluating can indicate that the Doppler metric data is above the threshold value, and taking the action can comprise communicating information to the user equipment that informs the user equipment that the network device is stopping a process of sending transmit rank information to the user equipment.

The result of the evaluating can indicate that the Doppler metric data is below the threshold value, and taking the action can comprise communicating information to the user equipment that informs the user equipment that the network device is at least one of starting a first process of sending a transmit precoding matrix index indication to the user equipment, or resuming a second process of sending transmit rank information to the user equipment.

Obtaining the Doppler metric data corresponding to the relative speed of the user equipment can comprise obtaining positioning data at intervals, and determining the Doppler metric data based on the positioning data. Obtaining the Doppler metric data corresponding to the relative speed of the user equipment can comprise obtaining a rate of change based on uplink channel estimates, and obtaining the Doppler metric data based on the rate of change. Obtaining the Doppler metric data corresponding to the relative speed of the user equipment can comprise obtaining reports comprising respective downlink channel quality information, determining a rate of change of the respective downlink channel quality information of the reports over time, and determining the Doppler metric data as a function of the rate of change of the respective downlink channel quality information over time.

Further aspects may comprise selecting, by the network device, a first value as the threshold value in response to a change in the Doppler metric data being determined to correspond to an increase in the relative speed of the user equipment, and selecting, by the network device, a second value as the threshold value in response to the change in the Doppler metric data being determined to correspond to a decrease in the relative speed of the user equipment.

Figure 8:
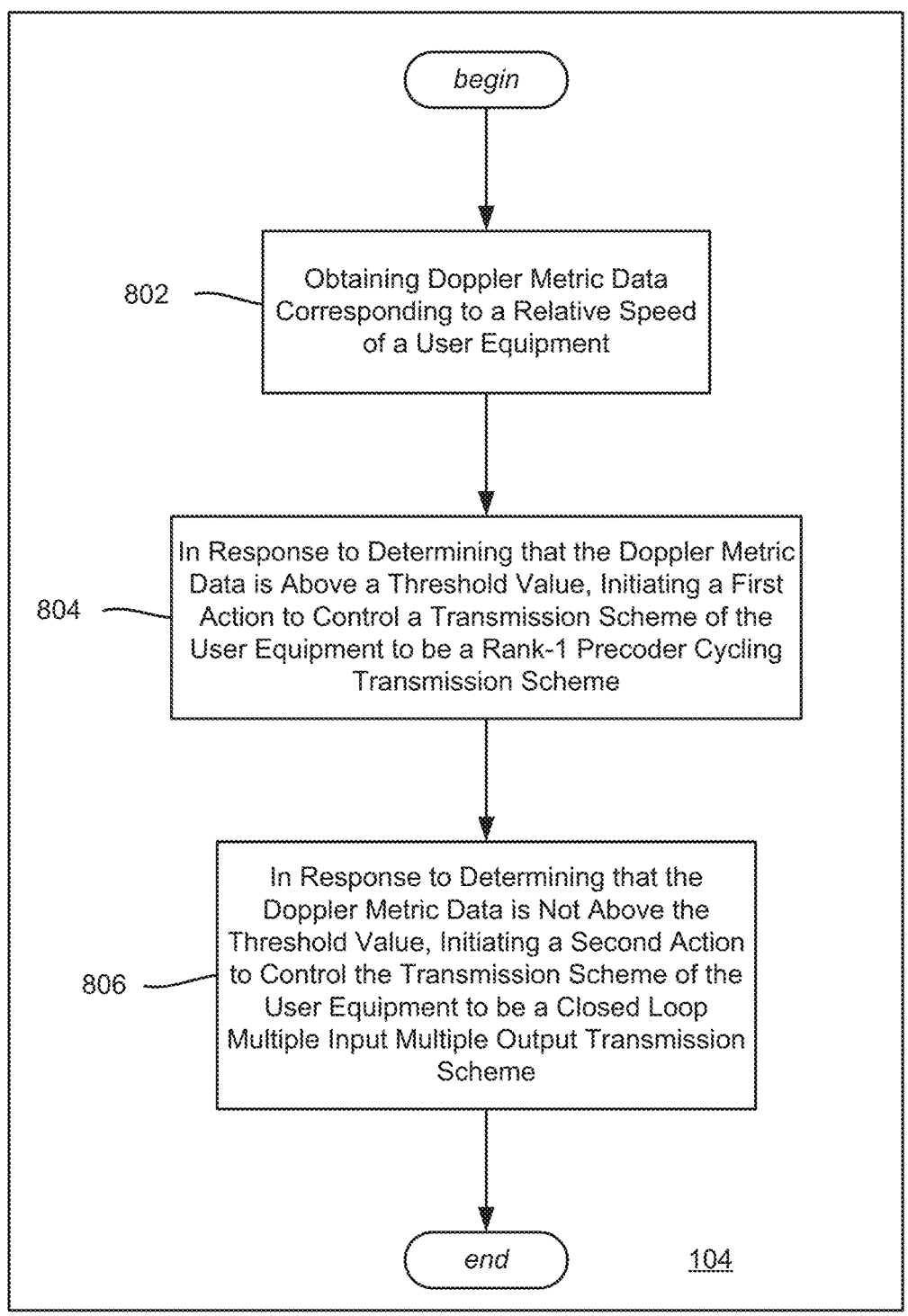
FIG. 8 illustrates a block diagram of a network device's example operations, comprising operations for taking action to change the transmission schema the user equipment based on a Doppler metric, in accordance with various aspects and implementations of the subject disclosure.

An example embodiment of a network device 104 comprising a processor and a memory that stores executable instructions that, when executed by the processor, facilitate performance of operations, is represented in FIG. 8. Example operations can include obtaining Doppler metric data corresponding to a relative speed of a user equipment (operation 802), and In response to determining that the Doppler metric data is above a threshold value, initiating a first action to control a transmission scheme of the user equipment to be a rank-1 precoder cycling transmission scheme (operation 804). Operation 806 represents, in response to determining that the Doppler metric data is not above the threshold value, initiating a second action to control the transmission scheme of the user equipment to be a closed loop multiple input multiple output transmission scheme.

Initiating the first action to control the transmission scheme can comprise communicating a first recommendation of the rank-1 precoder cycling transmission scheme transmission scheme to the user equipment, and the initiating the second action to control the transmission scheme can comprise communicating a second recommendation of the closed loop multiple input multiple output transmission scheme to the user equipment.

Initiating the first action to control the transmission scheme can comprise communicating information to the user equipment that informs the user equipment that the network device is turning off sending transmit rank information to the user equipment, and initiating the second action to control the transmission scheme can comprise communicating other information to the user equipment that informs the user equipment that the network device is turning on the sending of the transmit rank information to the user equipment.

Obtaining the Doppler metric data corresponding to the relative speed of the user equipment can comprise at least one of: determining the Doppler metric data based on global positioning data obtained at different times, obtaining a rate of change based on uplink channel estimates, and using the rate of change to obtain the Doppler metric data, or obtaining downlink channel quality information reports, determining a rate of change of downlink channel quality information in the downlink channel quality information reports over time, and determining the Doppler metric data based on the rate of change.

Further operations can comprise, in response to a change in the Doppler metric data being determined to correspond to an increase in the relative speed of the user equipment, selecting a first value as the threshold value, and in response to the change in the Doppler metric data being determined to correspond to a decrease in the relative speed of the user equipment, selecting a second value as the threshold value.

Figure 9:
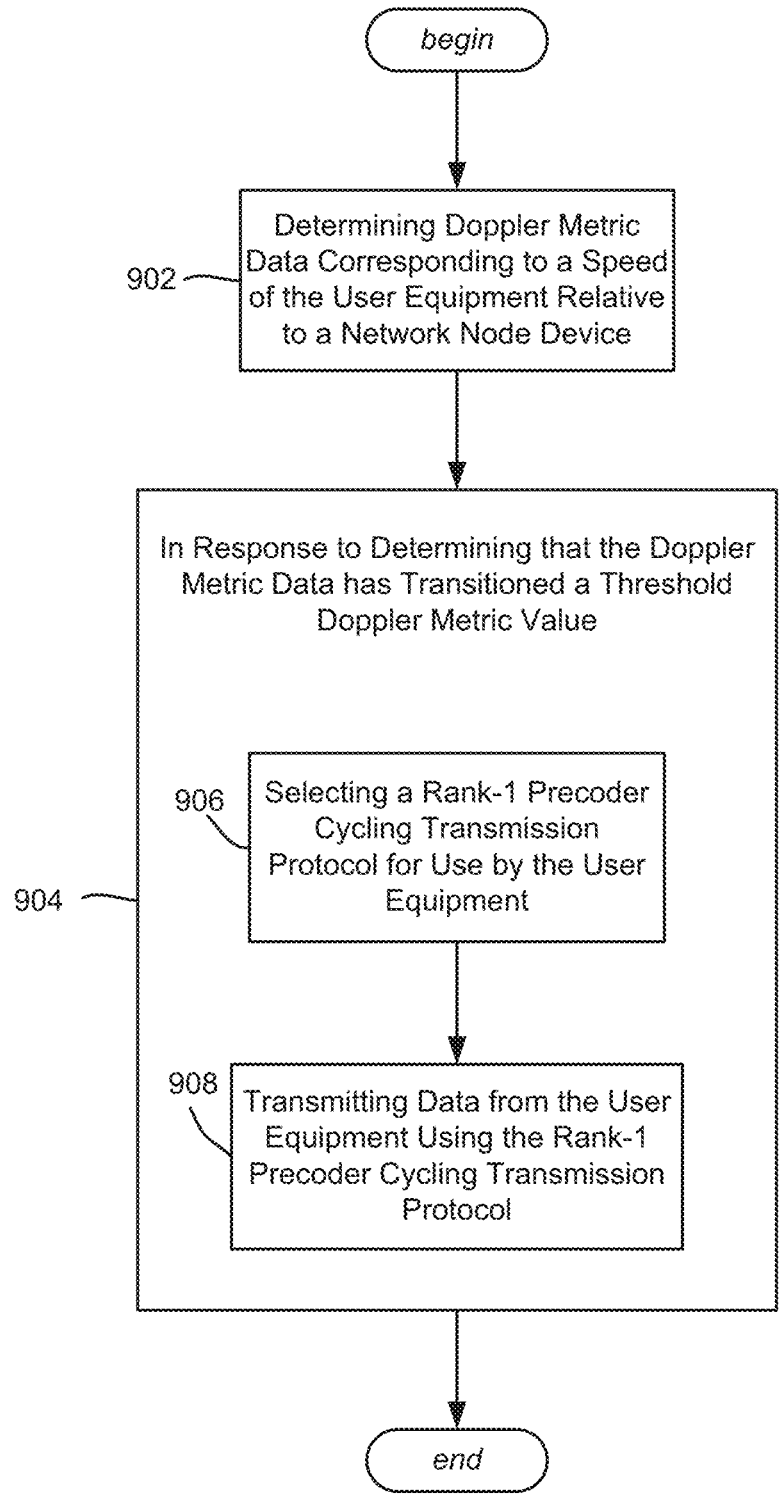
FIG. 9 illustrates an example flow diagram of a user equipment (or network device) operations for changing the transmission scheme of the user equipment based on a Doppler metric, in accordance with various aspects and implementations of the subject disclosure, in accordance with various aspects and implementations of the subject disclosure.

FIG. 9 represents operations, such as in the form of a machine-readable storage medium, comprising executable instructions that, when executed by a processor of a user equipment, facilitate performance of operations. Operation 902 represents determining Doppler metric data corresponding to a speed of the user equipment relative to a network node device. Operation 904 represents, in response to determining that the Doppler metric data has transitioned a threshold Doppler metric value, selecting (operation 906) a rank-1 precoder cycling transmission protocol for use by the user equipment, and transmitting data (operation 908) from the user equipment using the rank-1 precoder cycling transmission protocol.

Further operations can comprise, in response determining that the Doppler metric data has not transitioned the threshold Doppler metric value, selecting a closed loop multiple input multiple output transmission protocol for use by the user equipment, and transmitting the data from the user equipment using the closed loop multiple input multiple output transmission protocol. Still further operations can comprise, selecting a first value as the threshold Doppler metric value in response to determining a change in the Doppler metric data over time corresponds to an increase in the relative speed of the user equipment, and selecting a second value as the threshold Doppler metric value in response to determining the change in the Doppler metric data over time corresponds to a decrease in the relative speed of the user equipment.

Figure 10:
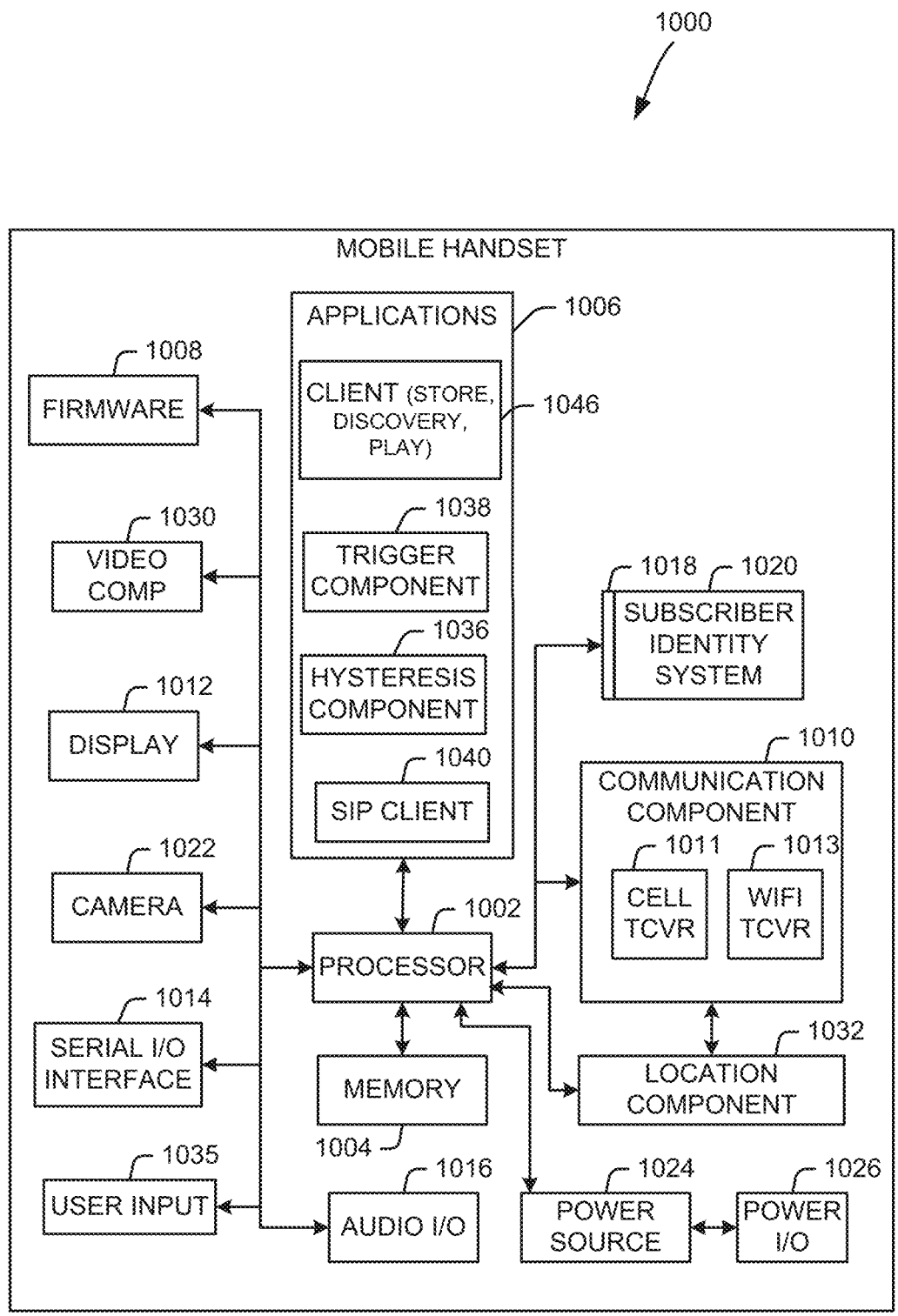
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hard-wire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
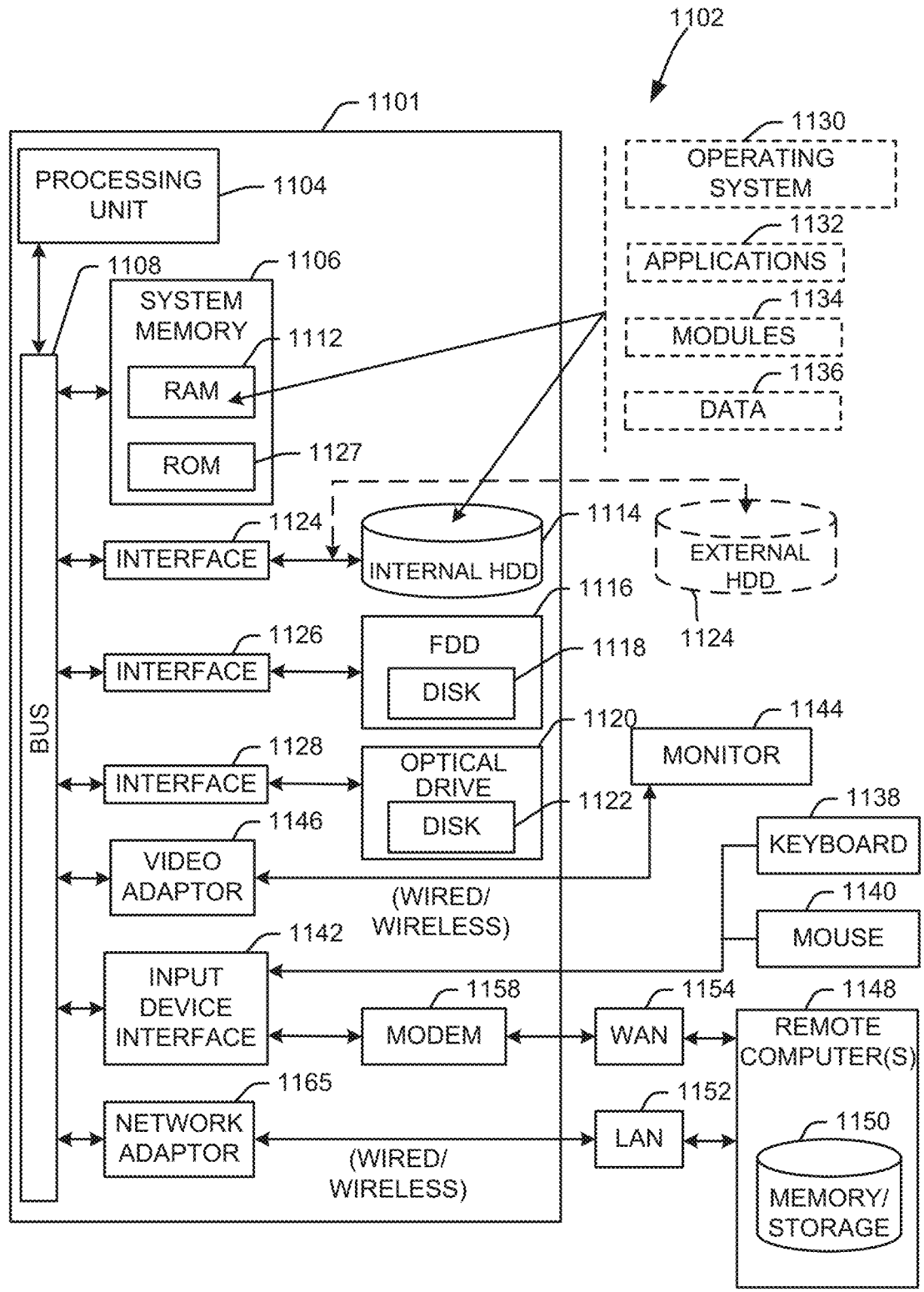
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

In order to provide a context for the various aspects of the disclosed subject matter, FIG. 11 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 1120, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, a mobile device and/or portable device can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 and a move use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
    obtaining, by a network device comprising a processor, a dataset comprising speeds of movement of a user equipment during a time period;
    modifying, by the network device and based on a rate of change of a speed of movement of the user equipment as indicated by the speeds of movement of the user equipment during the time period, a threshold value associated with an action to change a transmission scheme of the user equipment resulting in a modified threshold value;
    evaluating, by the network device, a current speed of movement of the user equipment with respect to the modified threshold value; and
    based at least in part on a result of the evaluating with respect to the modified threshold value, taking, by the network device, the action to change the transmission scheme of the user equipment according to a change of a group of changes, wherein the group of changes comprises a first change from a closed loop multiple input multiple output transmission scheme to a rank-1 precoder cycling transmission scheme and a second change from the rank-1 precoder cycling transmission scheme to the closed loop multiple input multiple output transmission scheme.

2. The method of claim 1, wherein the result of the evaluating indicates that the current speed of movement of the user equipment is above the modified threshold value, and wherein the taking the action comprises communicating a recommendation of the transmission scheme to the user equipment to change the transmission scheme according to the first change from the closed loop multiple input multiple output transmission scheme to the rank-1 precoder cycling transmission scheme.

3. The method of claim 1, wherein the result of the evaluating indicates that the current speed of movement of the user equipment is below the modified threshold value, and wherein the taking the action comprises communicating a recommendation of the transmission scheme to the user equipment to change the transmission scheme according to the second change from the rank-1 precoder cycling transmission scheme to the closed loop multiple input multiple output transmission scheme.

4. The method of claim 1, wherein the taking the action comprises communicating a recommendation of the transmission scheme to the user equipment via a flag value in downlink control channel data.

5. The method of claim 1, wherein the result of the evaluating indicates that the current speed of movement of the user equipment is above the modified threshold value, and wherein the taking the action comprises communicating information to the user equipment that informs the user equipment that the network device is discontinuing a process of sending a transmit precoding matrix index indication to the user equipment.

6. The method of claim 5, wherein the communicating the information comprises communicating the information via radio resource control signaling or physical layer signaling.

7. The method of claim 1, wherein the result of the evaluating indicates that the current speed of movement of the user equipment is above the modified threshold value, and wherein the taking the action comprises communicating information to the user equipment that informs the user equipment that the network device is stopping a process of sending transmit rank information to the user equipment.

8. The method of claim 1, wherein the result of the evaluating indicates that the current speed of movement of the user equipment is below the modified threshold value, and wherein the taking the action comprises communicating information to the user equipment that informs the user equipment that the network device is at least one of starting a first process of sending a transmit precoding matrix index indication to the user equipment, or resuming a second process of sending transmit rank information to the user equipment.

9. The method of claim 1, wherein the obtaining the dataset comprising the speeds of movement of the user equipment comprises obtaining positioning data at intervals, and determining the speeds of movement of the user equipment based on the positioning data.

10. The method of claim 1, wherein the obtaining the dataset comprising the speeds of movement of the user equipment comprises obtaining uplink channel estimates, and determining the speeds of movement of the user equipment based on the uplink channel estimates.

11. The method of claim 1, wherein the obtaining the dataset comprising the speeds of movement of the user equipment comprises obtaining reports comprising respective downlink channel quality information, and determining the speeds of movement of the user equipment as a function of the respective downlink channel quality information.

12. The method of claim 1, further comprising, selecting, by the network device, a first value as the modified threshold value in response to the rate of change of the speed of movement of the user equipment being determined to correspond to an increasing speed of the user equipment, and selecting, by the network device, a second value as the modified threshold value in response to the rate of change of the speed of movement of the user equipment being determined to correspond to a decreasing speed of the user equipment.

13. A radio network device, comprising:
    a processor; and
    a memory that stores executable instructions that, when executed by the processor, facilitate performance of operations, the operations comprising:
        obtaining a dataset comprising speeds of movement of a user equipment during a time period;
        modifying, based on a rate of change of a speed of movement of the user equipment as indicated by the speeds of movement of the user equipment during the time period, a threshold value associated with a transmission scheme of the user equipment to generate a modified threshold value;
        in response to determining that a current speed of movement of the user equipment is above the modified threshold value, initiating a first action to control the transmission scheme of the user equipment to be a rank-1 precoder cycling transmission scheme; and
        in response to determining that the current speed of movement of the user equipment is not above the modified threshold value, initiating a second action to control the transmission scheme of the user equipment to be a closed loop multiple input multiple output transmission scheme.

14. The radio network device of claim 13, wherein the initiating the first action to control the transmission scheme comprises communicating a first recommendation of the rank-1 precoder cycling transmission scheme transmission scheme to the user equipment, and wherein the initiating the second action to control the transmission scheme comprises communicating a second recommendation of the closed loop multiple input multiple output transmission scheme to the user equipment.

15. The radio network device of claim 13, wherein the initiating the first action to control the transmission scheme comprises communicating information to the user equipment that informs the user equipment that the radio network device is turning off sending transmit rank information to the user equipment, and wherein the initiating the second action to control the transmission scheme comprises communicating other information to the user equipment that informs the user equipment that the radio network device is turning on the sending of the transmit rank information to the user equipment.

16. The radio network device of claim 13, wherein the obtaining the dataset comprising the speeds of movement of the user equipment comprises at least one of:
   determining the speeds of movement of the user equipment based on global positioning data obtained at different times;
   obtaining uplink channel estimates, and using the uplink channel estimates to obtain the speeds of movement of the user equipment; or
   obtaining downlink channel quality information reports, and determining the speeds of movement of the user equipment based on the downlink channel quality information reports.

17. The radio network device of claim 13, wherein the operations further comprise:
   in response to a change in the rate of change of the speed of movement of the user equipment being determined to indicate an increasing speed of movement of the user equipment, selecting a first value as the modified threshold value; and
   in response to the change in the rate of change of the speed of movement of the user equipment being determined indicate a decreasing of movement of the user equipment, selecting a second value as the modified threshold value.

18. A non-transitory machine-readable medium, comprising executable instructions that, when executed by a processor of a user equipment, facilitate performance of operations, the operations comprising:
   determining a dataset comprising speeds of movement the user equipment during a time period;
   modifying, based on a rate of change of a speed of movement of the user equipment as indicated by the speeds of movement of the user equipment during the time period, a first threshold value associated with a transmission protocol for the user equipment to generate a second threshold value; and
   in response to determining that a current speed of movement of the user equipment has transitioned to the second threshold value:
   selecting a rank-1 precoder cycling transmission protocol for use by the user equipment, and
   transmitting data from the user equipment using the rank-1 precoder cycling transmission protocol.

19. The non-transitory machine-readable medium of claim 18, wherein the operations further comprise, in response determining that the current speed of movement of the user equipment has not transitioned the second threshold value, selecting a closed loop multiple input multiple output transmission protocol for use by the user equipment, and transmitting the data from the user equipment using the closed loop multiple input multiple output transmission protocol.

20. The non-transitory machine-readable medium of claim 18, wherein the modifying comprises modifying the first threshold value in response to determining that the rate of change of the speed of movement of the user equipment as indicated by the speeds of movement of the user equipment during the time period corresponds to an increasing or a decreasing speed of movement of the user equipment.

* * * * *